D. R. RAYMOND.
VEHICLE SPRING.
APPLICATION FILED DEC. 16, 1915.
1,210,839.
Patented Jan. 2, 1917.
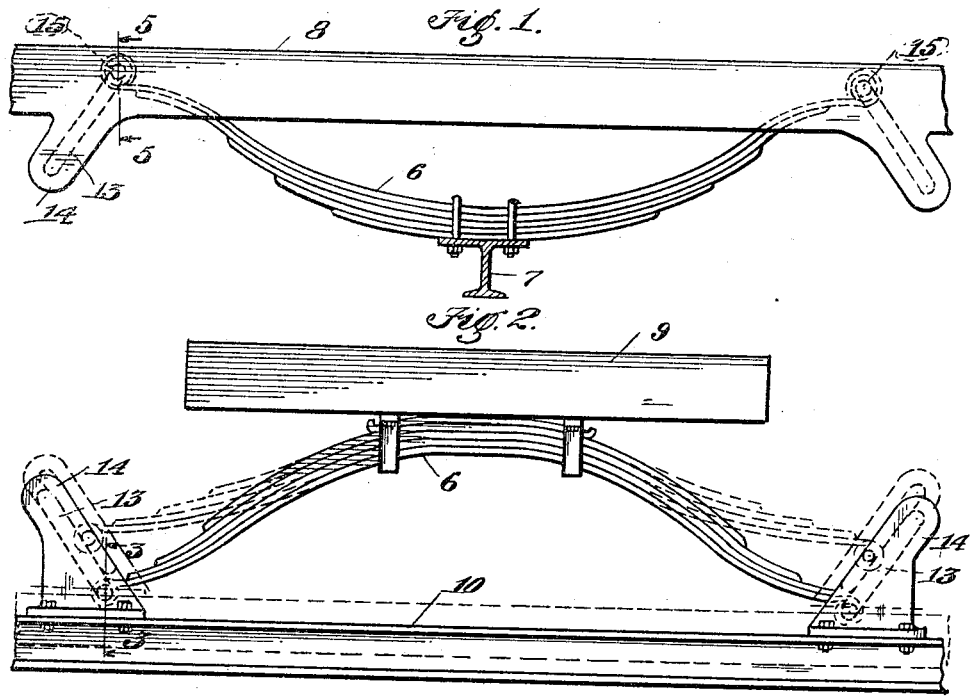
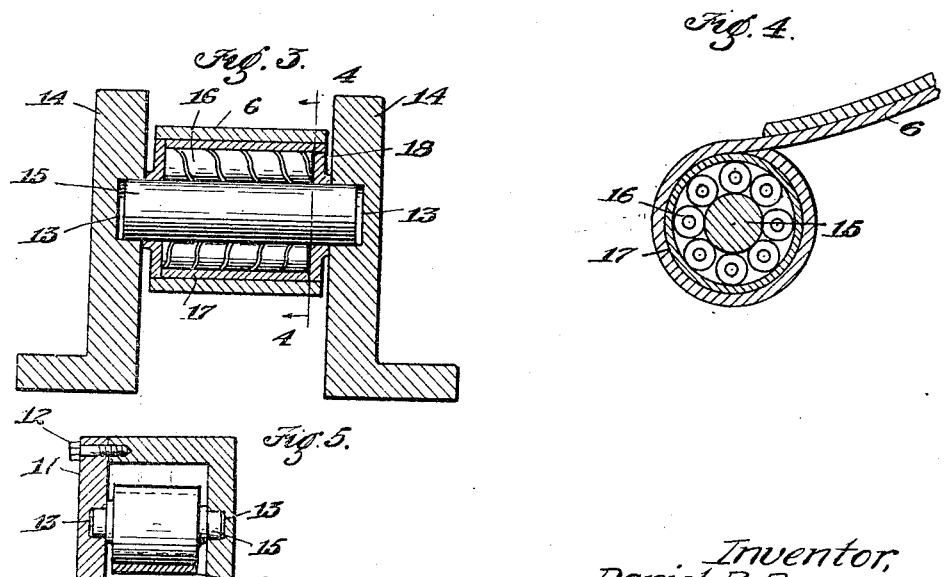
Inventor,
Daniel R. Raymond.
by
Hazard Berry & Miller
attys.

UNITED STATES PATENT OFFICE.

DANIEL R. RAYMOND, OF LOS ANGELES, CALIFORNIA.

VEHICLE-SPRING.

1,210,839.

Specification of Letters Patent.  Patented Jan. 2, 1917.

Application filed December 16, 1915. Serial No. 67,188.

*To all whom it may concern:*

Be it known that I, DANIEL R. RAYMOND, a citizen of the United States, residing at Los Angeles, in the county of Los Angeles and State of California, have invented new and useful Improvements in Vehicle-Springs, of which the following is a specification.

This invention relates to a spring and particularly pertains to a vehicle spring and the mounting therefor.

It is the object of this invention to provide a spring and spring mounting which is especially adapted for use on vehicles such as automobiles and the like to cushion movement between the vehicle axles and the frame or body.

Another object is to provide a spring of the above character so constructed and arranged that the vehicle body will remain substantially on the normal plane irrespective of vertical movement of the vehicle axles in relation thereto.

Another object is to provide a mounting for a spring of the semi-elliptical type which will permit of elongation of the spring on depression thereof and which on the elongation of the spring will operate to elevate the load carried by the spring in opposition to the tendency of the load to move downward as is the case of the ordinary semi-elliptic spring arrangements and which will thus serve to lessen movement of the vehicle body in relation to the axles.

Another object is to provide a slidable mounting for the extremities of the semi-elliptic spring, embodying inclined walls on which the ends of the spring are adapted to travel to longitudinally and vertically advance the end portions of the spring in relation to the vehicle axle on upward movement of the latter.

A further object is to provide a novel roller connection between the ends of the spring and the inclined walls engaged thereby.

Other objects will appear hereinafter.

The invention is illustrated in the accompanying drawings in which:

Figure 1 is a view in side elevation illustrating the invention as applied, showing the semi-elliptical spring as arranged with its ends extending upwardly and its center connected to a vehicle axle and showing the inclined spring engaging walls as formed integral with the vehicle frame. Fig. 2 is a view in side elevation illustrating the invention as applied to semi-elliptic springs arranged with their extremities extending downward and connected at its center to the vehicle body and showing the inclined spring engaging wall as detachably connected to the vehicle axle. Fig. 3 is an enlarged transverse section on the line 3—3 of Fig. 2 showing the construction of the roller connection between the spring and the inclined wall engaged thereby. Fig. 4 is a view in section and elevation as seen on the line 4—4 of Fig. 3 in the direction indicated by the arrows. Fig. 5 is a view in section and elevation on the line 5—5 of Fig. 1 showing the manner of forming the inclined walls integral with the vehicle frame.

More specifically, 6 indicates an ordinary semi-elliptical spring which may be attached at its longitudinal center either to the vehicle axle or to a vehicle frame in the manner common in vehicle construction. As illustrated in Fig. 1, the spring 6 is rigidly secured intermediate its ends to an axle 7 and has its extremities turned upwardly to engage the vehicle frame 8. As shown in Fig. 2 the spring is secured intermediate its ends to vehicle frame 9 and has its extremities turned downwardly to connect with the axle 10.

The essence of the present invention resides in providing an inclined wall at each end of the spring and a slidable engagement between the springs and the wall. In Fig. 1 the inclined wall is formed integral with the frame 8 which frame is composed of a channel iron as illustrated in Fig. 5, having one of its side portions 11 removably secured to the top portion of the channel by bolts 12. Formed on the inner faces of the side members of the channel are opposed downwardly divergent grooves 13 with which the ends of the spring are engaged as later described. The inclined walls may be formed on a pair of demountable brackets 14 as shown in Fig. 3; the adjacent faces of the brackets being provided with the inclined grooves 13. Where the spring is arranged with its ends extending upwardly, as in Fig. 1, the grooves 13 forming the inclined walls before mentioned, are disposed to diverge downwardly, and where the spring is shown as arranged in Fig. 2 with its ends extending downwardly, the grooves are disposed to diverge upwardly. In other words, the direction of divergence of the grooves or walls is opposite the direction of movement of the spring on compression so that the ends of the springs which are normally positioned at the nearest ends of the grooves will be caused to move outwardly in said grooves on compression of the spring.

The connection between each end of the spring and the adjacent grooves is here shown as comprising a revoluble shaft 15, the ends of which extend into the grooves 13 as shown in Figs. 3 and 5. This shaft 15 is carried by the end of the spring and is preferably mounted in an anti-friction bearing which consists of a series of anti-friction rollers 16 which are arranged around the shaft 15 and within an annular bushing 17. The bushing 17 is fitted with end walls 18 for holding the rollers 16 in place and through which the shaft 15 extends. The end of the spring is bent to encircle and firmly engage the bushing 17 as shown in Fig. 4. By thus mounting the shaft 15 it may have rotary movement in relation to the inclined walls of the grooves 13 also to the spring 6 and slidably engaging parts are thus avoided.

In the operation of the invention, reference being had to Fig. 1, upward movement of the axle 7 in relation to the vehicle frame 8 will operate to compress the spring 6 which tends to elongate the span thereof and causes the shafts 15 in its ends to move downwardly on the inclined walls of the grooves 13 which movement of the springs tends to prevent upward movement of the frame 8 with the axle 7 and to permit vertical movement of the axle without materially disturbing the plane of the vehicle frame. The operation is substantially the same with the arrangement shown in Fig. 2 and upward movement of the axle 10 in opposition to the spring 6 and frame 9 will tend to elongate the span of the spring causing the ends thereof to ride upwardly on the inclined walls of the grooves 13. It will be seen that an upward impact on the spring by the vehicle axle tending to elongate the span of the spring, will cause the spring to have a tendency to exert a downward pull on the vehicle body or frame thereby neutralizing the tendency of the vehicle frame to move upward with the axle, thus substantially maintaining the vehicle frame on an even plane irrespective of vertical movement of the axle in relation thereto.

What I claim is:

1. In a suspension device, a pair of spaced parallel plates having correspondingly inclined opposed grooves on their adjacent faces, a second pair of spaced plates formed with correspondingly inclined opposed grooves on their adjacent faces, inclined oppositely in relation to the grooves on the other plates, said grooves having closed ends and parallel side walls, a pair of relatively movable members on one of which said pairs of plates are carried in spaced alinement, a semi-elliptic spring secured at its middle to the other movable member with its ends extending between the plates of each pair of plates, and pins carried on the ends of the spring projecting on each side thereof and terminating in the parallel grooves in position to bear on either side wall of the latter.

2. The combination with a pair of relatively movable members and a semi-elliptic spring interposed therebetween, of oppositely inclined grooved guide walls with which the ends of the spring are slidably engaged to permit elongation of the span of the spring on movement of the members toward each other.

3. The combination with a pair of relatively movable members, one of which is fitted with spaced divergent guide grooves having parallel side walls, a semi-elliptic spring interposed between said members, and a slidable connection between the extremities of said spring and the guide grooves engageable with either wall of said grooves.

4. The combination with a pair of relatively movable members, one of which is fitted with spaced divergent guide grooves, a semi-elliptic spring interposed between said members, and a slidable connection between the extremities of said spring and the guide grooves, said grooves diverging in a direction opposite the direction of compression of the spring and having parallel side walls.

5. The combination with a pair of relatively movable members, spaced oppositely inclined pairs of parallel grooved walls carried by one of said members, and a semi-elliptic spring attached intermediate its ends to the other member having its ends slidably engaged between said inclined parallel walls.

6. The combination of a pair of relatively movable members, spaced oppositely inclined grooved walls carried by one of said members, a semi-elliptic spring carried by the other member, and rollers on the extremities of said spring engaging the inclined walls, forming a slidable connection and co-acting with the walls on compression of the spring to permit elongation of the span of the latter and cause both ends of the spring to move away from the wall carrying member.

7. The combination with a pair of relatively movable members, a semi-elliptic spring carried by one of said members, brackets formed on the other member extending on opposite sides of said spring near its ends, inclined guide grooves on the adjacent faces of each pair of brackets, and shafts mounted in said grooves revolubly connected to the ends of the spring.

8. The combination with a pair of relatively movable members, a semi-elliptic spring carried by one of said members, brackets formed on the other member extending on opposite sides of said spring near its ends, inclined guide grooves on the adjacent faces of each pair of brackets, shafts mounted in said grooves revolubly connected to the ends of the spring, and anti-friction rollers interposed between said shafts and the spring.

9. In a suspension device, a pair of spaced parallel plates having correspondingly inclined opposed grooves on their adjacent faces, a second pair of spaced plates formed with correspondingly inclined opposed grooves on their adjacent faces, inclined oppositely in relation to the grooves on the other plates, said grooves having closed ends and parallel side walls, a pair of relatively movable members on one of which said pairs of plates are carried in spaced alinement, a semi-elliptic spring secured at its middle to the other movable member with its ends extending between the plates of each pair of plates, and turnable pins carried on the ends of the spring projecting on each side thereof and terminating in the parallel grooves in position to bear on either side wall of the latter.

In testimony whereof I have signed my name to this specification.

DANIEL R. RAYMOND.

Copies of this patent may be obtained for five cents each, by addressing the "Commissioner of Patents, Washington, D. C."